(12) United States Patent
Hattori et al.

(10) Patent No.: US 8,759,432 B2
(45) Date of Patent: Jun. 24, 2014

(54) RUBBER COMPOSITION FOR TREAD AND PNEUMATIC TIRE

(75) Inventors: Takayuki Hattori, Kobe (JP); Ai Matsuura, Kobe (JP); Hiroshi Ito, Kobe (JP); Jun Okamoto, Kobe (JP); Takao Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/894,581

(22) Filed: Sep. 30, 2010

(65) Prior Publication Data
US 2011/0082234 A1 Apr. 7, 2011

(30) Foreign Application Priority Data

Oct. 1, 2009 (JP) ................................. 2009-229928

(51) Int. Cl.
*B60C 1/00* (2006.01)
*C08K 5/098* (2006.01)
*C08L 15/00* (2006.01)

(52) U.S. Cl.
CPC ............... *B60C 1/0016* (2013.01); *C08K 5/098* (2013.01); *C08L 15/00* (2013.01)
USPC ........... 524/400; 524/399; 524/492; 524/526; 524/572; 524/575.5

(58) Field of Classification Search
USPC ............... 524/492, 572, 575.5, 399, 400, 526
See application file for complete search history.

(56) References Cited

U.S. PATENT DOCUMENTS

| 5,302,315 A * | 4/1994 | Umland .................... 252/182.14 |
| 2006/0167165 A1 * | 7/2006 | Hirayama et al. ............. 524/493 |
| 2009/0054550 A1 * | 2/2009 | Hochi ........................... 523/155 |

FOREIGN PATENT DOCUMENTS

| JP | 2005-272508 A | 10/2005 |
| JP | 2006-57103 A | 3/2006 |
| JP | 2007-31523 A | 2/2007 |
| JP | 2007-106799 A | 4/2007 |
| JP | 2007-169317 A | 7/2007 |
| JP | 2007-321041 A | 12/2007 |
| JP | 2011-32302 A | 2/2011 |
| WO | WO 2009/054277 A1 | 4/2009 |

* cited by examiner

*Primary Examiner* — Vickey Nerangis
(74) *Attorney, Agent, or Firm* — Birch, Stewart, Kolasch & Birch, LLP

(57) ABSTRACT

The present invention has its object to provide a rubber composition for a tread which can prevent reversion and can also achieve environmental performance (excellent rolling resistance, response to depletion of oil resources, attention to $CO_2$ emission), wet grip performance, dry grip performance, handling stability, and durability (abrasion resistance, crack resistance) in a well-balanced manner. The present invention also aims to provide a pneumatic tire using the rubber composition for the tread thereof. The rubber composition for a tread includes a rubber component containing 35% by mass or more of an epoxidized natural rubber; and a white filler, wherein a total sulfur content is less than 1.75% by mass, and a crosslink density is $7.0 \times 10^{-5}$ mol/cm$^3$ or more.

12 Claims, 1 Drawing Sheet

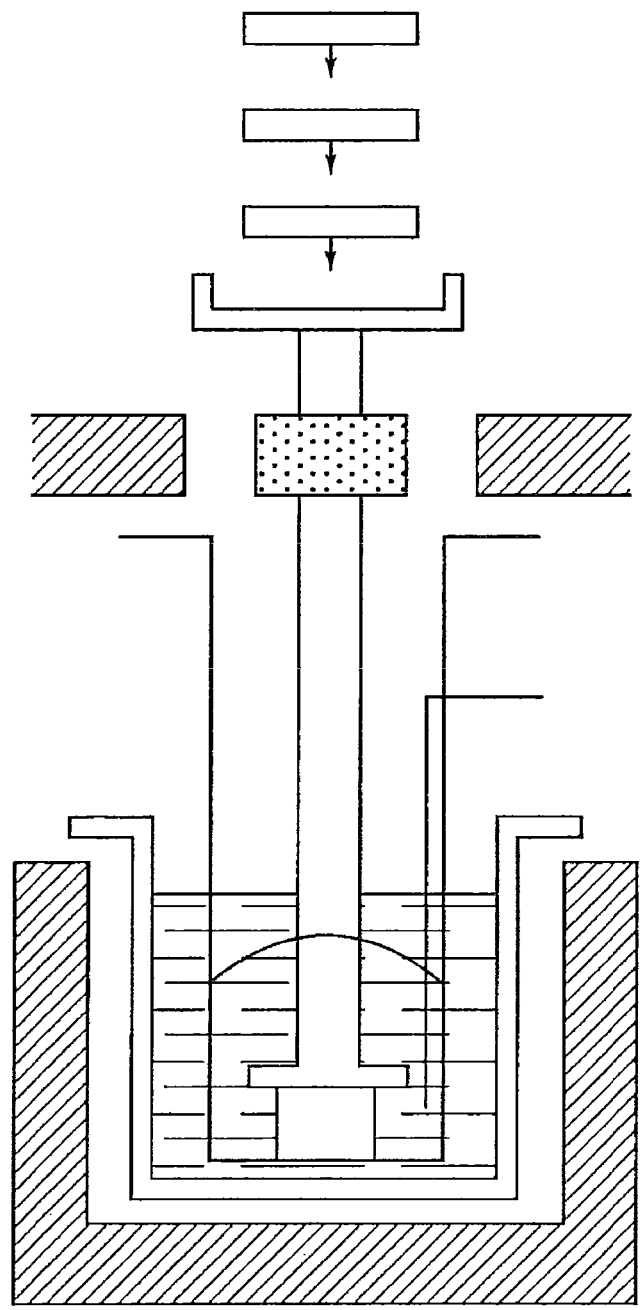

RUBBER COMPOSITION FOR TREAD AND PNEUMATIC TIRE

TECHNICAL FIELD

The present invention relates to a rubber composition for a tread and a pneumatic tire using the same.

BACKGROUND ART

Rubber compositions for a tire tread containing a natural rubber or the like as a main component have been proposed these days from the viewpoints of such issues as depletion of oil resources, reduction in rolling resistance, and environmental concerns. However, in the case that only a natural rubber is used as a rubber component, the wet grip performance of the obtained tread rubber is problematically inferior to that of conventional tread rubbers containing a styrene butadiene rubber as a main component.

In order to solve the problem, attempts have been made to improve the wet grip performance by blending an epoxidized natural rubber as a rubber component. Use of an epoxidized natural rubber as a rubber component provides a good wet grip performance; however, as compared with conventional tread rubbers containing a styrene butadiene rubber as a main component, the crack resistance and abrasion resistance need to be improved in especially the case that the obtained tread rubber is used for high performance tires (very low profile tires) or tires for heavy load vehicles among passenger vehicles. Regarding the crack resistance used herein, it has been desired to prevent cracking at the bottom of the tread groove in the direction of the groove, which is generated particularly by ozone or repeated strains.

In the case that an epoxidized natural rubber, natural rubber, butadiene rubber or the like is vulcanized, reversion may occur. The phenomenon of reversion includes deterioration of the rubber and degradation of the crosslinked structure. Results of studies conducted by the present inventors have revealed that the abrasion resistance and the rolling resistance property are deteriorated due to the phenomenon. Also, rigidity may be decreased, leading to poor handling stability. Moreover, if vulcanization is performed at higher temperatures so as to increase productivity of tires, the foregoing phenomenon may become more significant.

As methods to inhibit reversion of the rubber compositions and improve the heat resistance, techniques such as a method of increasing the amount of a vulcanization accelerator relative to the amount of sulfur as a vulcanizing agent and a method of blending a thiuram vulcanization accelerator as a vulcanization accelerator have been known. Meanwhile, as crosslinking agents capable of forming a long-chain crosslinked structure represented by —$(CH_2)_6$—S— or the like, PERKALINK 900 and Duralink HTS (both produced by Flexsys), Vulcuren KA9188 (produced by Bayer AG), and the like have been known. It is known that, by blending such a crosslinking agent in the rubber composition, reversion of the rubber composition can be inhibited. The foregoing methods have an effect on the inhibition of reversion of natural rubber or isoprene rubber; however, they problematically have little effect on the inhibition of reversion of epoxidized natural rubber or butadiene rubber.

Patent Document 1 has disclosed the effect of concomitant use of an epoxidized natural rubber and calcium stearate in improving the rubber strength. Patent Document 2 has disclosed the effect of blending a mixture of a zinc salt of an aliphatic carboxylic acid and a zinc salt of an aromatic carboxylic acid with a rubber component for inhibiting reversion. However, there is still room for improvement in achieving inhibition of reversion and at the same time achieving environmental performance (excellent rolling resistance, response to depletion of oil resources, attention to $CO_2$ emission), wet grip performance, dry grip performance, handling stability, and durability (abrasion resistance, crack resistance) in a well-balanced manner.

Patent Document 1: JP-A 2007-169317
Patent Document 2: JP-A 2007-321041

SUMMARY OF THE INVENTION

The present invention aims to solve the problems and provide a rubber composition for a tread which can not only prevent reversion but also achieve environmental performance (excellent rolling resistance, response to depletion of oil resources, attention to $CO_2$ emission), wet grip performance, dry grip performance, handling stability, and durability (abrasion resistance, crack resistance) in a well-balanced manner. The present invention also aims to provide a pneumatic tire having a tread manufactured by using the rubber composition.

The present invention relates to a rubber composition for a tread including: a rubber component containing 35% by mass or more of an epoxidized natural rubber; and a white filler, wherein a total sulfur content is less than 1.75% by mass, and a crosslink density is $7.0 \times 10^{-5}$ mol/cm$^3$ or more.

The white filler is desirably silica.

The rubber composition desirably includes a butadiene rubber.

The rubber composition desirably includes a mixture of a zinc salt of an aliphatic carboxylic acid and a zinc salt of an aromatic carboxylic acid.

The vulcanization temperature for the rubber composition is desirably 120° C. to 165° C.

The present invention also relates to a pneumatic tire having a tread manufactured by using the above-mentioned rubber composition.

The rubber composition for a tread according to the present invention contains a rubber component including a specific amount or more of an epoxidized natural rubber, and a white filler. In the rubber composition for a tread, the total sulfur content is less than a specific value, and the crosslink density is a predetermined value or more. Therefore, the rubber composition can not only prevent reversion but also achieve excellent rolling resistance, wet grip performance, dry grip performance, handing stability, and durability (abrasion resistance, crack resistance) in a well-balanced manner. Further, as a specific amount or more of an epoxidized natural rubber and a white filler are contained, the amount of non-petroleum resources can be increased, making it possible to respond to depletion of oil resources and to consider $CO_2$ emission.

The rubber composition for a tread can be favorably applied for a tread of tires, and thus it is possible to provide tires which can achieve environmental performance (excellent rolling resistance, response to depletion of oil resources, attention to $CO_2$ emission), wet grip performance, dry grip performance, handling stability, and durability (abrasion resistance, crack resistance) in a well-balanced manner.

BRIEF DESCRIPTION OF THE DRAWINGS

FIG. 1 is a schematic view illustrating a TMA apparatus used for measuring crosslink density.

BEST MODE FOR CARRYING OUT THE INVENTION

The rubber composition for a tread according to the present invention contains a rubber component including a specific amount or more of an epoxidized natural rubber (ENR), and a white filler, wherein the total sulfur content is less than a specific value and the crosslink density is a predetermined value or more.

By controlling the total sulfur content to be less than a specific value and also controlling the crosslink density to be a predetermined value or more in the rubber composition for a tread, it is possible to reduce undesirable sulfur or sulfur crosslinking in an unfavorable form so that effective and stable crosslinking points can be provided. As a result, it is possible to allow the vulcanized rubber composition to have necessary rigidity for achieving handling stability. Furthermore, the vulcanized rubber composition can deform easily according to small irregularities on the road surface at low temperatures. Thus, the wet grip performance can be improved. Moreover, good rolling resistance and abrasion resistance can be obtained, and it is thus possible to provide a rubber composition for a tread which has the performance less likely to change in use and has excellent durability.

As an ENR is used in the present invention, the rubber composition can achieve good wet grip performance while making consideration for depletion of oil resources, reduction in rolling resistance, environmental concerns, and the like. The ENR is not particularly limited and may be a commercially available epoxidized natural rubber or may be prepared by epoxidizing a natural rubber (NR). Methods for epoxidizing natural rubber are not particularly limited, and examples thereof include the chlorohydrin process, the direct oxidation process, the hydrogen peroxide process, the alkyl hydroperoxide process, and the peracid process (see, for example, JP-B H4-26617, JP-AH2-110182, and GB Patent No. 2113692). Examples of the peracid process include a process in which an organic peracid such as peracetic acid or performic acid is reacted with natural rubber. Adjustment of the amount of an organic peracid and the reaction time enables preparation of epoxidized natural rubbers having various degrees of epoxidation.

The epoxidation degree as used herein refers to the proportion (mol %) of the number of epoxidized double bonds to the total number of double bonds in the rubber before epoxidation. In the present invention, the epoxidation degree is determined by, for example, a titration analysis or nuclear magnetic resonance (NMR) analysis.

The natural rubber to be epoxidized is not particularly limited, and examples thereof include natural rubbers generally used in the tire industry, such as SIR20, RSS#3, TSR20, deproteinized natural rubber (DPNR), and highly purified natural rubber (HPNR).

The epoxidation degree of the ENR is desirably 5 mol % or higher, more desirably 10 mol % or higher, and further desirably 20 mol % or higher. The epoxidation degree of less than 5 mol % may not sufficiently improve the wet grip performance. The epoxidation degree of the ENR is desirably 60 mol % or lower, more desirably 50 mol % or lower, and further desirably 40 mol % or lower. The epoxidation degree exceeding 60 mol % may cause gelation of the polymer (rubber component) or may deteriorate ozone resistance and reversion resistance.

The amount of the ENR in 100% by mass of the rubber component is 35% by mass or more, desirably 45% by mass or more, and more desirably 55% by mass or more. The amount of the ENR of less than 35% by mass may not sufficiently improve the wet grip performance. The amount of the ENR may be 100% by mass, but is desirably 95% by mass or less, more desirably 85% by mass or less, and further desirably 75% by mass or less. The amount of the ENR exceeding 95% by mass may excessively reduce the relative amount of BR or the like, and thus the crack resistance and the abrasion resistance may not be sufficiently improved.

Examples of usable rubbers other than ENR as a rubber component include natural rubber (NR), butadiene rubber (BR), styrene butadiene rubber (SBR), styrene-isoprene-butadiene rubber (SIBR), ethylene-propylene-diene rubber (EPDM), chloroprene rubber (CR), and acrylonitrile butadiene rubber (NBR). Each of the rubbers as a rubber component may be used either alone or as a combination of two or more kinds. BR is desirable among the above examples because use of BR can achieve good abrasion resistance, crack resistance and rolling resistance. Better abrasion resistance and crack resistance can be exerted particularly when BR is used for high performance tires (very low profile tires) or tires for heavy load vehicles among passenger vehicles.

The BR is not particularly limited, and examples thereof include: BRs with a high cis-content such as BR1220 (produced by ZEON Corporation), BR130B and BR150B (each produced by UBE INDUSTRIES, LTD.); and syndiotactic polybutadiene crystal-containing BRs such as VCR412 and VCR617 (each produced by UBE INDUSTRIES, LTD.).

The BR to be used is desirably a biomass-derived BR in consideration of reducing the environmental burdens. Butadiene rubbers of this kind can be obtained, for example, by the synthesis with butadiene as raw material, which is obtained by bringing a catalyst into contact with a bioethanol. Although a butadiene rubber synthesized from biomass-derived materials may be blended as a part of the BR, the BR in the rubber composition particularly desirably contains 100% by mass of a biomass-derived butadiene rubber. The biomass-derived materials as used herein refer to "renewable organic resources of biologic origin excluding fossil resources". The derivation of biomass can be determined by a method (ASTM-D6866) of identifying the amount of C14.

The cis-content of the BR is desirably 80% by mass or more, more desirably 85% by mass or more, further desirably 90% by mass or more, and particularly desirably 95% by mass or more. The cis-content of less than 80% by mass tends not to provide sufficient abrasion resistance, crack resistance and rolling resistance.

The amount of the BR in 100% by mass of the rubber component is desirably 5% by mass or more, more desirably 10% by mass or more, and further desirably 15% by mass or more. The amount of less than 5% by mass tends not to provide sufficient abrasion resistance, crack resistance and rolling resistance. The amount of the BR in 100% by mass of the rubber component is desirably 60% by mass or less, more desirably 50% by mass or less, and further desirably 40% by mass or less. The amount of more than 60% by mass reduces the relative amount of the ENR, and thus the wet grip performance may not be sufficiently improved.

The total amount of the BR and the ENR in 100% by mass of the rubber component is desirably 80% by mass or more, more desirably 90% by mass or more, and further desirably 100% by mass. The total amount of less than 80% by mass tends to make it difficult to be environmentally friendly while achieving both good abrasion resistance and good wet grip performance. Further, the effects of the present invention may not be sufficiently obtained.

A white filler is used in the present invention. The white filler refers to a filler that is white and is made of an inorganic substance. More specifically, examples of the white filler include silica, calcium carbonate, mica such as sericite, aluminum hydroxide, magnesium oxide, magnesium hydroxide, clay, talc, alumina, and titanium oxide. Silica is desirably used among the above examples because of its reinforcing effect, effect of reducing the rolling resistance, and effect of improving the grip performance.

The silica is not particularly limited, and examples thereof include dry silica (silicic anhydride) and wet silica (hydrous silicic acid). Wet silica is desirable because it contains a larger amount of silanol groups. The silica may be used either alone or as a combination of two or more kinds.

The nitrogen adsorption surface area ($N_2SA$) of the silica is desirably 40 $m^2/g$ or more, more desirably 50 $m^2/g$ or more, further desirably 80 $m^2/g$ or more, and particularly desirably 100 $m^2/g$ or more. The $N_2SA$ of the silica of less than 40 $m^2/g$ may lead to insufficient reinforcement, and thus the abrasion resistance and the mechanical strength (tensile strength, elongation at break, breaking energy) maybe deteriorated. The $N_2SA$ of the silica is desirably 450 $m^2/g$ or less, more desirably 200 $m^2/g$ or less, and further desirably 180 $m^2/g$ or less. The $N_2SA$ of the silica of more than 450 $m^2/g$ may deteriorate the processability and also reduce the dispersibility, causing increase in the heat build-up of the rubber composition. As a result, the rolling resistance may be deteriorated. The nitrogen adsorption surface area of the silica is determined by the BET method in accordance with ASTM D3037-81.

The amount of the silica per 100 parts by mass of the rubber component is desirably 30 parts by mass or more, more desirably 40 parts by mass or more, and further desirably 45 parts by mass or more. The amount of silica of less than 30 parts by mass tends not to achieve a sufficient reinforcing effect. The amount of the silica per 100 parts by mass of the rubber component is desirably 150 parts by mass or less, more desirably 120 parts by mass or less, further desirably 100 parts by mass or less, and particularly desirably 80 parts by mass or less. The amount of the silica of more than 150 parts by mass tends to deteriorate the processability.

In the present invention, carbon black may be blended as a filler other than the white filler. However, from the viewpoints of reduction in rolling resistance, response to depletion of oil resources, and attention to $CO_2$ emission, the relative proportion of the white filler is desirably high.

In the case that silica is used as the white filler in the present invention, a silane coupling agent is desirably used together with the silica.

As the silane coupling agent, conventionally known silane coupling agents may be used, and examples thereof include: sulfide-type silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide, and 3-trimethoxysilylpropylmethacrylate monosulfide; mercapto-type silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl-type silane coupling agents such as vinyltriethoxysilane and vinyltrimethoxysilane; amino-type silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-type silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-type silane coupling agents such as 3-nitropropyltrimethoxysilane, and 3-nitropropyltriethoxysilane; and chloro-type silane coupling agents such as 3-chloropropyltrimethoxysilane, 3-chloropropyltriethoxysilane, 2-chloroethyltrimethoxysilane, and 2-chloroethyltriethoxysilane. The silane coupling agent may be used either alone or as a combination of two or more kinds. Bis(3-triethoxysilylpropyl)tetrasulfide and bis(3-triethoxysilylpropyl)disulfide are desirable among the above examples in view of the reinforcing effect of the silane coupling agent, processability, and cost.

The amount of the silane coupling agent per 100 parts by mass of the silica is desirably 1 part by mass or more, more desirably 3 parts by mass or more, further desirably 5 parts by mass or more, and particularly desirably 7 parts by mass or more. The amount of the silane coupling agent of less than 1 part by mass tends to largely deteriorate the tensile strength and the rolling resistance. The amount of the silane coupling agent per 100 parts by mass of the silica is desirably 15 parts by mass or less and more desirably 10 parts by mass or less. The amount of the silane coupling agent exceeding 15 parts by mass may fail to provide further effects produced by addition of the silane coupling agent, such as improvement of the tensile strength and reduction in rolling resistance, and consequently, the cost tends to unnecessarily increase.

Sulfur is used as a vulcanizing agent in the present invention. As the sulfur, sulfur powder, precipitated sulfur, colloidal sulfur, insoluble sulfur, and highly dispersible sulfur may be exemplified.

The amount of the sulfur per 100 parts by mass of the rubber component is desirably 0.2 parts by mass or more, more desirably 0.5 parts by mass or more, further desirably 0.7 parts by mass or more, and particularly desirably 0.85 parts by mass or more. The amount of less than 0.2 parts by mass may make it difficult to achieve a necessary crosslink density for the present invention. The amount of the sulfur per 100 parts by mass of the rubber component is desirably 2.05 parts by mass or less, more desirably 1.75 parts by mass or less, further desirably 1.50 parts by mass or less, particularly desirably 1.25 parts by mass or less, and most desirably 1.10 parts by mass or less. The amount of more than 2.05 parts by mass may not only make it difficult to achieve the total sulfur content defined in the present invention but also increase undesirable sulfur or sulfur crosslinking in an unfavorable form. As a result, it may be difficult to simultaneously achieve good handling stability, wet grip performance, rolling resistance and durability.

The rubber composition of the present invention may contain a mixture of a zinc salt of an aliphatic carboxylic acid and a zinc salt of an aromatic carboxylic acid. The present inventors have found that the mixture is very effective for improving the heat resistance of the ENR and for inhibiting reversion of the ENR and BR. Use of the mixture can inhibit reversion and at the same time can achieve a predetermined degree or more of crosslink density with less than a specific amount of the total sulfur content (small total sulfur content). Therefore, it is possible to achieve good handling stability as well as good wet grip performance, and further possible to achieve good rolling resistance and abrasion resistance. Furthermore, it becomes possible to blend BR while achieving less reversion, and thus the abrasion resistance and the crack resistance can be significantly improved. The mixture is greatly suitable as an anti-reversion agent having a favorable action on both ENR and BR. On the other hand, although other anti-reversion agents (for example, PERKALINK 900 produced by Flexsys) have an effect on the reversion of NR, they have no effect or little effect on the reversion of ENR or BR in many cases.

With regard to the zinc salt of an aliphatic carboxylic acid, examples of the aliphatic carboxylic acid include: aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; and aliphatic carboxylic acids chemically synthesized from petroleum or the like. Vegetable oil-derived aliphatic carboxylic acids are desirable because they are environment-friendly, and it is possible to prepare for a future decrease in oil supply and also possible to sufficiently inhibit reversion and reduce the cost. Aliphatic carboxylic acids derived from coconut oil, palm kernel oil, or palm oil are more desirable.

The number of carbon atoms of the aliphatic carboxylic acid is desirably four or more, and more desirably six or more. If the number of carbon atoms of the aliphatic carboxylic acid is less than four, the dispersibility tends to be deteriorated. The number of carbon atoms of the aliphatic carboxylic acid is desirably 16 or less, more desirably 14 or less, and further desirably 12 or less. If the number of carbon atoms of the aliphatic carboxylic acid is more than 16, reversion tends not to be sufficiently inhibited.

The aliphatic group in the aliphatic carboxylic acid may be one having a chain structure, such as an alkyl group, or one having a ring structure, such as a cycloalkyl group.

With regard to the zinc salt of an aromatic carboxylic acid, examples of the aromatic carboxylic acid include benzoic acid, phthalic acid, mellitic acid, hemimellitic acid, trimellitic acid, diphenic acid, toluic acid, and naphthoic acid. Benzoic acid, phthalic acid, and naphthoic acid are desirable among the examples as they can sufficiently inhibit reversion.

The content ratio of the zinc salt of an aliphatic carboxylic acid to the zinc salt of an aromatic carboxylic acid in the mixture [molar ratio: (zinc salt of aliphatic carboxylic acid)/(zinc salt of aromatic carboxylic acid), hereinafter referred to as "the content ratio"] is desirably 1/20 or more, more desirably 1/15 or more, and further desirably 1/10 or more. If the content ratio is less than 1/20, it may be impossible to be environment-friendly and to prepare for a future decrease in oil supply, and further, the dispersibility and stability of the mixture tend to be deteriorated. The content ratio is desirably 20/1 or less, more desirably 15/1 or less, and further desirably 10/1 or less. The content ratio of more than 20/1 may not sufficiently inhibit reversion.

The zinc content in the mixture is desirably 3% by mass or more, and more desirably 5% by mass or more. If the zinc content in the mixture is less than 3% by mass, inhibition of reversion tends to be insufficient. The zinc content in the mixture is desirably 30% by mass or less, and more desirably 25% by mass or less. If the zinc content in the mixture is more than 30% by mass, the processability tends to be deteriorated and the cost may be unnecessarily increased.

The amount of the mixture per 100 parts by mass of the rubber component is desirably 0.2 parts by mass or more, more desirably 0.5 parts by mass or more, further desirably 1.0 part by mass or more, particularly desirably 1.5 parts by mass or more, and most desirably 2.5 parts by mass or more. The amount of less than 0.2 parts by mass may not achieve sufficient reversion resistance and sufficient performance of improving crosslink density. Therefore, it tends to be difficult to provide an effect of maintaining the durability of tires and an effect of improving the handling stability. The amount of the mixture per 100 parts by mass of the rubber component is desirably 10 parts by mass or less, more desirably 7 parts by mass or less, and further desirably 5 parts by mass or less. The amount of more than 10 parts by mass tends to increase frequency of blooming and to lead to lower improvement in the effects for the added amount, resulting in an unnecessary increase in cost.

An alkaline fatty acid metal salt may be contained in the rubber composition of the present invention. Since an acid used for synthesizing the ENR is neutralized by the alkaline fatty acid metal salt, degradation of the ENR due to heat during kneading and vulcanization can be prevented. It is also possible to prevent reversion.

With regard to the alkaline fatty acid metal salt, examples of the metal include sodium, potassium, calcium, and barium. Calcium and barium are desirable among the examples, considering that these metals increase the heat resistance and have better compatibility with epoxidized natural rubber. Specific examples of the alkaline fatty acid metal salt include: metal stearates such as sodium stearate, magnesium stearate, calcium stearate, and barium stearate; and metal oleates such as sodium oleate, magnesium oleate, calcium oleate, and barium oleate. Calcium stearate and calcium oleate are desirable among the examples because they have a better heat-resisting effect, have high compatibility with epoxidized natural rubber, and require a relatively low cost.

The amount of the alkaline fatty acid metal salt per 100 parts by mass of the ENR is desirably 1.0 part by mass or more, more desirably 1.5 parts by mass or more, and further desirably 3.0 parts by mass or more. In the case that the amount of the alkaline fatty acid metal salt is less than 1.0 part by mass, sufficient effects on the heat resistance and the reversion resistance tend to be hardly obtained. The amount of the alkaline fatty acid metal salt per 100 parts by mass of the ENR is desirably 10 parts by mass or less, and more desirably 8 parts by mass or less. The amount of more than 10 parts by mass tends to deteriorate the tensile strength and the abrasion resistance.

The rubber composition according to the present invention may contain fatty acids such as stearic acid, palmitic acid, myristic acid, lauric acid, caprylic acid, oleic acid, and linoleic acid, and among these, stearic acid is desirable because of its low cost.

In the rubber composition of the present invention, the total amount of the alkaline fatty acid metal salt, the mixture of a zinc salt of an aliphatic carboxylic acid and a zinc salt of an aromatic carboxylic acid, and the fatty acid per 100 parts by mass of the rubber component is desirably 2.5 parts by mass or more, more desirably 4 parts by mass or more, and further desirably 6 parts by mass or more. The amount of less than 2.5 parts by mass tends not to sufficiently prevent the degradation or reversion of the ENR and tends not to improve the efficiency for effectively crosslinking the added sulfur. The foregoing total amount per 100 parts by mass of the rubber component is desirably 20 parts by mass or less, more desirably 17 parts by mass or less, and further desirably 12 parts by mass or less. The total amount of more than 20 parts by mass tends to reduce the abrasion resistance and the mechanical strength.

The rubber composition of the present invention may contain zinc oxide.

The amount of the zinc oxide per 100 parts by mass of the rubber component is desirably 0.5 parts by mass or more, more desirably 1.5 parts by mass or more, further desirably 2.5 parts by mass or more, and particularly desirably 4.0 parts by mass or more. The amount of less than 0.5 parts by mass may not sufficiently increase the efficiency for crosslinking sulfur and thus, more effective crosslinking points may not be provided with less than a specific value of the total sulfur content (small total sulfur content). The amount of the zinc oxide per 100 parts by mass of the rubber component is desirably 15 parts by mass or less, more desirably 10 parts by mass or less, and further desirably 5 parts by mass or less. The amount of more than 15 parts by mass may unnecessarily increase the cost and may deteriorate the dispersibility of the zinc oxide, possibly causing problems in the crack resistance and the abrasion resistance.

Other than the foregoing ingredients, the rubber composition of the present invention may optionally contain, as appropriate, compounding ingredients conventionally used in the rubber industry, for example, inorganic or organic fillers, softening agents such as oils, various age resistors, antiozonants, waxes, vulcanization accelerators, and the like.

As the vulcanization accelerator, conventionally known vulcanization accelerators may be used, and for example, it is possible to use a product that contains at least one selected from the group consisting of sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. Each of these vulcanization accelerators may be used either alone or as a combination of two or more kinds. Sulfenamide vulcanization accelerators are desirable among the above examples because of the low cost and excellent balance between the efficiency for accelerating vulcanization and the resistance to scorching.

Examples of the sulfenamide vulcanization accelerators include sulfenamide compounds such as CBS (N-cyclohexyl-2-benzothiazyl sulfenamide), TBBS (N-tert-butyl-2-benzothiazolyl sulfenamide), N,N'-dicyclohexyl-2-benzothiazyl sulfenamide, N-oxydiethylene-2-benzothiazyl sulfenamide, N,N-diisopropyl-2-benzothiazole sulfenamide, and the like. TBBS and CBS are desirable among the examples because they require a low cost and provide an appropriate vulcanization curve.

The rubber composition of the present invention can be produced according to a usual method. That is, for example, the aforementioned ingredients are kneaded with a Banbury mixer, a kneader, or an open roll mill and then vulcanized to produce the rubber composition.

The vulcanization temperature is desirably 120° C. or higher, more desirably 135° C. or higher, and further desirably 145° C. or higher. The vulcanization temperature of lower than 120° C. tends to prolong the vulcanization time so that the productivity is decreased. The vulcanization temperature is desirably 165° C. or lower, more desirably 160° C. or lower, and further desirably 155° C. or lower. The vulcanization temperature of higher than 165° C. may cause reversion or increase sulfur crosslinking in an unfavorable form. As a result, achievement of both the crosslink density and the total sulfur content defined in the present invention may become difficult.

The total sulfur content in the rubber composition for a tread (after vulcanization) according to the present invention is less than 1.75% by mass, desirably 1.72% by mass or less, more desirably 1.65% by mass or less, further desirably 1.50% by mass or less, and most desirably 1.30% by mass or less. The total sulfur content of 1.75% by mass or more increases undesirable sulfur or sulfur crosslinking in an unfavorable form, and thus sufficient handling stability, wet grip performance, rolling resistance and durability (abrasion resistance, crack resistance) tend not to be obtained. Although a lower total sulfur content leads to a better result, the content is desirably 0.5% by mass or more, and in some cases needs to be 1.0% by mass or more, so as to achieve the crosslink density of $7.0 \times 10^{-5}$ mol/cm$^3$ or more.

Here, the total sulfur content is a value obtained according to the measuring method described in the Examples below.

The crosslink density (total crosslink density) of the rubber composition for a tread (after vulcanization) according to the present invention is $7.0 \times 10^{-5}$ mol/cm$^3$ or more, desirably $8.0 \times 10^{-5}$ mol/cm$^3$ or more, more desirably $9.5 \times 10^{-5}$ mol/cm$^3$ or more, further desirably $1.0 \times 10^{-4}$ mol/cm$^3$ or more, and most desirably $1.1 \times 10^{-4}$ mol/cm$^3$ or more. The crosslink density is desirably $5 \times 10^{-4}$ mol/cm$^3$ or less, more desirably $3 \times 10^{-4}$ mol/cm$^3$ or less, and further desirably $2 \times 10^{-4}$ mol/cm$^3$ or less. The crosslink density of less than $7.0 \times 10^{-5}$ mol/cm$^3$ may lead to lacking in effective crosslinking points, and thus the handling stability and the rolling resistance may be deteriorated.

The crosslink density of higher than $5 \times 10^{-4}$ mol/cm$^3$ may be too high, and thus the hardness may excessively increase or the rubber composition may become brittle, resulting in deterioration of flex crack growth resistance.

The total crosslink density can be measured according to the method described in JP-A 2002-17898.

According to the present invention, a rubber composition for a tread having the above total sulfur content and crosslink density can be obtained by including, as the components, not only a specific amount or more of an epoxidized natural rubber, and a white filler, but also the mixture of a zinc salt of an aliphatic carboxylic acid and a zinc salt of an aromatic carboxylic acid and/or the alkaline fatty acid metal salt described above; by including BR; by performing vulcanization at the above-mentioned vulcanization temperature; by setting the blending amount of sulfur to be the aforementioned value; by setting the blending amount of zinc oxide to be the foregoing value; and/or the like.

The hardness of the rubber composition for a tread (after vulcanization) according to the present invention is desirably 64 or more, more desirably 65 or more, and further desirably 66 or more. The hardness is desirably 70 or less, more desirably 69 or less, and further desirably 68 or less. The hardness in the above range can simultaneously achieve good handling stability and good abrasion resistance.

The hardness is a value obtained according to the measuring method described in Examples below.

The rubber composition of the present invention can be suitably used for a tread of a pneumatic tire.

The pneumatic tire of the present invention can be produced by a usual method using the rubber composition. That is, the unvulcanized rubber composition is extruded and processed into a tread shape, molded in a usual manner on a tire building machine, and then assembled with other tire components to obtain an unvulcanized tire. Then, the unvulcanized tire is subjected to heating and pressing in a vulcanizer to obtain a tire.

Usage of pneumatic tires of the present invention is not particularly limited. The tires can be suitably used especially as high performance tires (very low profile tires) and as tires for heavy load vehicles among passenger vehicles.

EXAMPLES

The present invention will be specifically described based on Examples, but is not intended to be limited only to these Examples.

The respective chemical agents used in Examples and Comparative Examples are listed below.

ENR (1): Epoxidized natural rubber (epoxidation degree: 25 mol %,

Tg: −47° C.), produced by MRB (Malaysia)
ENR (2): Epoxidized natural rubber (trial product) (epoxidation degree: 37.5 mol %, Tg: −35° C.), produced by MRB (Malaysia)
BR (1): BR150B (cis content: 97% by mass, $ML_{1+4}$ (100° C.): 40, viscosity of a 5% solution in toluene at 25° C.: 48, Mw/Mn: 3.3, Tg: −104° C.), produced by Ube Industries, Ltd.
BR (2): BR, trial product A (cis content: 98% by mass, $ML_{1+4}$ (100° C.): 51, viscosity of a 5% solution in toluene at 25° C.: 122,
Mw/Mn: 3.3, Tg: −104° C.), produced by Ube Industries, Ltd.
Silica: Ultrasil VN2 ($N_2SA$: 125 m²/g), produced by Degussa
Silane coupling agent: Si69 (bis(3-triethoxysilylpropyl)tetrasulfide), produced by Degussa
Vegetable oil: Refined soybean oil (S) (iodine value: 131, fatty acid component having at least 18 carbon atoms: 84.9%), produced by Nisshin Oillio, Ltd.
Alkaline fatty acid metal salt: Calcium stearate, produced by NOF Corporation
Stearic acid: Kiri, produced by NOF Corporation
Anti-reversion agent (1) (mixture of zinc salt of aliphatic carboxylic acid and zinc salt of aromatic carboxylic acid): Activator 73A ((i) zinc salt of aliphatic carboxylic acid: zinc salt of coconut oil-derived fatty acid (number of carbon atoms: 8 to 12); (ii) zinc salt of aromatic carboxylic acid: zinc benzoate; molar ratio: 1/1; zinc content: 17% by mass), produced by Struktol
Anti-reversion agent (2): PERKALINK 900 (1,3-bis(citraconimidomethyl)benzene), produced by Flexsys Zinc oxide: Zinc oxide #2, produced by Mitsui Mining & Smelting Co., Ltd.
Age resistor: NOCRAC 6C (N-(1,3-dimethylbutyl)-N'-phenyl-p-phenylenediamine), produced by Ouchi Shinko Chemical Industrial Co., Ltd.
Wax: SUNNOC Wax, produced by Ouchi Shinko Chemical Industrial Co., Ltd.
Sulfur: Sulfur powder, produced by Tsurumi Chemical Industry Co., Ltd.
Vulcanization accelerator: Nocceler NS (N-tert-butyl-2-benzothiazolyl sulfenamide), produced by Ouchi Shinko Chemical Industrial Co., Ltd.

Examples 1 to 13 and Comparative Examples 1 to 8

According to the respective formulations shown in Table 1, the chemical agents each in an amount shown in process 1 in Table 1 were introduced into a Banbury mixer and kneaded for 5 minutes so as to raise the outlet temperature to approximately 150° C.

Thereafter, sulfur and the vulcanization accelerator each in an amount shown in process 2 were added to the mixture obtained in process 1, and then kneaded with an open roll mill for 3 minutes at a temperature of approximately 80° C., so that an unvulcanized rubber composition was produced. The resulting unvulcanized rubber composition was molded into a tread shape, assembled with other tire components and then vulcanized for 15 minutes at a temperature of 170° C. (high temperature vulcanization) in Examples 1, 4, 5, 7 to 9, 11 to 13, and Comparative Examples 1 to 8, or vulcanized for 30 minutes at a temperature of 150° C. (low temperature vulcanization) in Examples 2, 3, 6, and 10. Accordingly, test tires (tire size: 195/65 R15) in Examples and Comparative Examples were manufactured.

The following evaluations were made using the thus obtained unvulcanized rubber compositions and test tires. The test results were shown in Table 1.

(1) Reversion Resistance

A vulcanization curve of each unvulcanized rubber composition at a temperature of 170° C. (high temperature vulcanization (Examples 1, 4, 5, 7 to 9, 11 to 13, and Comparative Examples 1 to 8)) or at a temperature of 150° C. (low temperature vulcanization (Examples 2, 3, 6, 10)) was determined using a vulcanization testing machine (Curelastometer produced by JSR Trading Co., Ltd.). A maximum torque (MH) value, a minimum torque (ML) value, a torque value M obtained 20 minutes (or 45 minutes at 150° C.) after the start of vulcanization were measured so that the reversion of each formulation was calculated according to the following equation for evaluation. A smaller reversion ratio indicates better inhibition of reversion, and thus excellent reversion resistance.

(Reversion ratio (%))=$(MH-M)/(MH-ML) \times 100$ (2) Hardness

In accordance with JIS K 6253 "Rubber, vulcanized or thermoplastic—Determination of hardness", the hardness of the vulcanized rubber composition cut out from the tread rubber of each of the test tires was determined by a type A durometer.

(3) Wet Grip Performance

Wet grip performance was evaluated based on the braking performance obtained by the anti-lock braking system (ABS) evaluation test. More specifically, the test tires were mounted on a 1800 cc-class passenger car equipped with ABS, and the car was driven on an asphalt road surface (condition of the road surface: wet, skid number: approximately 50). Then, the brake was stepped on when the speed was 100 km/h, and the deceleration until the car stopped was calculated. The deceleration as used herein refers to a distance required for the car to stop after the brake is stepped on. Further, based on the following equation, the deceleration for the tires of each formulation was expressed as a wet grip performance index relative to the wet grip performance index of Comparative Example 1 regarded as 100. A larger wet grip performance index indicates better braking performance on a wet road surface, and thus excellent wet grip performance.

(Wet grip performance index)=(Deceleration of Comparative Example 1)/(Deceleration of each formulation)×100

(4) Dry Grip Performance

Dry grip performance was evaluated based on the braking performance obtained by the anti-lock braking system (ABS) evaluation test. More specifically, the test tires were mounted on a 1800 cc-class passenger car equipped with ABS, and the car was driven on an asphalt road surface (condition of the road surface: dry). Then, the brake was stepped on when the speed was 100 km/h, and the deceleration until the car stopped was calculated. The deceleration as used herein refers to a distance required for the car to stop after the brake is stepped on. Further, based on the following equation, the deceleration for the tires of each formulation was expressed as a dry grip performance index relative to the dry grip performance index of Comparative Example 1 regarded as 100. A larger dry grip performance index indicates better braking performance on a dry road surface, and thus excellent dry grip performance.

(Dry grip performance index)=(Deceleration of Comparative Example 1)/(Deceleration of each formulation)×100

(5) Handling Performance (Handling Stability)

Using the above passenger car, sensory evaluation by a test driver was performed on starting, acceleration, and stopping on a dry road surface and a wet road surface. The result of the sensory evaluation was expressed as an index relative to that of Comparative Example 1 regarded as 100, the index being 120 when the test driver recognized clear improvement in the performance and being 140 when the driver recognized a high level of performance never been obtained before.

(6) Rolling Resistance Test

A vulcanized rubber composition was cut out from the tread rubber of each test tire, and a test sample was cut out from the vulcanized rubber composition. Tan δ of each vulcanized rubber composition was measured using a viscoelastic spectrometer VES (produced by Iwamoto Seisakusho Co., Ltd.) under conditions of: a temperature of 50° C.; an initial strain of 10%; a dynamic strain of 2%; and a frequency of 10 Hz. Based on the equation below, the rolling resistance was expressed as a rolling resistance index relative to the rolling resistance index of Comparative Example 1 regarded as 100. A smaller index indicates a lower rolling resistance, meaning that the rolling resistance is excellent.

(Rolling resistance index)=((Tan δ of each formulation)/(Tan δ of Comparative Example 1))×100

(7) Abrasion Resistance Test (Abrasion Test)

The test tires were mounted on a 1800 cc-class passenger car equipped with ABS, and the amount of decrease in the depth of the tire grooves after the car had run 8000 km in an urban area was measured. The running distance that decreased the depth of the tire grooves by 1 mm was calculated. Further, based on the following equation, the decrease in the depth of the tire grooves for each formulation was expressed as an abrasion resistance index relative to the abrasion resistance index of Comparative Example 1 regarded as 100. A larger abrasion resistance index indicates better abrasion resistance.

(Abrasion resistance index)=(Running distance at which the groove depth of the tire of each formulation is decreased by 1 mm)/(Running distance at which the groove depth of the tire of Comparative Example 1 is decreased by 1 mm)×100

(8) Total Sulfur Content

The total sulfur content was measured according to a method disclosed in JIS K 6350 (1976) "Method of analysis for rubber goods" at a section of determination of total sulfur content on pages 6-7 (in Japanese edition).

(9) Crosslink Density (Total Crosslink Density)

The crosslink density (total crosslink density) was calculated as follows.

First, a round columnar sample 3 mm in diameter was punched out of the vulcanized rubber sheet cut out from the tread rubber of each of the test tires produced in the respective Examples and Comparative Examples. This sample was immersed in acetone at 20° C. for 24 hours, and thus an oil and an age resistor were extracted. The sample after the extraction was immersed in a mixed solvent of tetrahydrofuran (THF) and benzene (1:1 (Mass/Mass)) at 20° C. for 24 hours to be swollen.

Next, the sample was introduced into a TMA apparatus (FIG. 1) filled with a mixed solvent of tetrahydrofuran (THF) and benzene (1:1 (Mass/Mass)) at 20° C. Then, a value of $(\tau_0/(1/\alpha^2-\alpha))$ was determined from the relationship between compression stress and strain in the TMA apparatus. The thus obtained value and dimensions of the sample were substituted into the following equation (I), Flory's theoretical equation, and the total crosslink density ($v_T$) of the tread rubber was calculated. The test was performed on three samples and the results were averaged.

[Equation I]

$$v_T = \frac{ve'}{V0'} = \frac{\tau_0}{RT\left(\alpha - \frac{1}{\alpha^2}\right)} \sqrt[3]{\frac{1-\phi}{(Ls0/L0)^3 - \phi}} \quad (I)$$

$\tau_0$: stress=F/A0 [g/mm$^2$]
F: stress [g]
ve: the number of cross-linking points
ve': the number of cross-linking points [mol]
k: Boltzmann constant 1.381×10$^{23}$ [J/K]
R: gas constant 8.314 [J/mol·K]→R=kNa (Na: Avogadro's constant=6.02×10$^{-23}$ mol$^{-1}$)
T: measurement temperature [K]
V0: total volume of sample [mm$^3$]
V0': pure rubber polymer volume=V0(1−φ) [mm$^3$]
φ: filler volume fraction (filler volume/total rubber volume)
α: compression ratio of sample after swelling=Ls/Ls0
L0: sample length before swelling [mm]
Ls: compressed swollen-sample length [mm]
Ls0: sample length after swelling [mm]
A0: edge area of sample before swelling [mm$^2$]
A1: edge area of sample after swelling=A0(Ls0/L0) [mm$^2$]
Here, $\tau_0$ can be determined according to the following equation:

$$\tau_0 = \frac{RTve'}{V0'} \sqrt[3]{\frac{(Ls0/L0)^3 - \phi}{1-\phi}} \left(\alpha - \frac{1}{\alpha^2}\right).$$

TABLE 1

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Formulation (part(s) by mass) | Process 1 | ENR (1) | 100 | 100 | 100 | 100 | 100 | 100 | 70 | 70 | 70 | 70 | 50 |
| | | ENR (2) | — | — | — | — | — | — | — | — | — | — | — |
| | | BR (1) | — | — | — | — | — | — | 30 | 30 | 30 | 30 | 50 |
| | | BR (2) | — | — | — | — | — | — | — | — | — | — | — |
| | | Silica | 75 | 75 | 52 | 75 | 75 | 75 | 75 | 75 | 75 | 75 | 75 |
| | | Silane coupling agent | 6.0 | 6.0 | 4.2 | 6.0 | 6.0 | 6.0 | 6.0 | 6.0 | 6.0 | 6.0 | 6.0 |
| | | Vegetable oil | 10 | 10 | 10 | 10 | 10 | 10 | 10 | 10 | 10 | 10 | 10 |
| | | Alkaline fatty acid metal salt | 5 | 5 | 5 | 5 | 5 | 5 | 4 | 4 | 4 | 4 | 2.5 |
| | | Stearic acid | 2 | 2 | 2 | 2 | 2 | 2 | 2 | 2 | 2 | 2 | 2 |

TABLE 1-continued

|  |  |  |  |  |  |  |  |  |  |  |  |  |
|---|---|---|---|---|---|---|---|---|---|---|---|---|
|  |  | Anti-reversion agent (1) | 3 | 3 | 3 | 0.7 | 5 | — | 3 | 0.7 | 5 | — | 3 |
|  |  | Anti-reversion agent (2) | — | — | — | — | — | — | — | — | — | — | — |
|  |  | Zinc oxide | 3 | 3 | 3 | 3 | 3 | 3 | 3 | 3 | 3 | 3 | 3 |
|  |  | Age resistor | 1.5 | 1.5 | 1.5 | 1.5 | 1.5 | 1.5 | 1.5 | 1.5 | 1.5 | 1.5 | 1.5 |
|  |  | Wax | 1.5 | 1.5 | 1.5 | 1.5 | 1.5 | 1.5 | 1.5 | 1.5 | 1.5 | 1.5 | 1.5 |
|  | Process 2 | Sulfur | 1.05 | 1.05 | 2.0 | 2.0 | 2.0 | 2.0 | 2.0 | 2.0 | 2.0 | 2.0 | 2.0 |
|  |  | Vulcanization accelerator | 2.0 | 2.0 | 2.0 | 2.0 | 2.0 | 2.0 | 2.0 | 2.0 | 2.0 | 2.0 | 2.0 |
| Vulcanization condition |  |  | High TEMP | Low TEMP | Low TEMP | High TEMP | High TEMP | Low TEMP | High TEMP | High TEMP | High TEMP | Low TEMP | High TEMP |
| Total sulfur content (% by mass) |  |  | 1.23 | 1.23 | 1.65 | 1.70 | 1.70 | 1.70 | 1.69 | 1.70 | 1.67 | 1.71 | 1.70 |
| Total crosslink density ($10^{-5}$ mol/cm$^3$) |  |  | 7.2 | 8.5 | 11.4 | 7.3 | 10.1 | 7.1 | 9.9 | 7.2 | 9.9 | 7.0 | 9.0 |
| Evaluation | Reversion ratio (%) |  | 0.7 | 0 | 0 | 11 | 1.5 | 1.5 | 0.8 | 11 | 0.6 | 1.2 | 1.0 |
|  | Hardness |  | 65 | 67 | 64 | 67 | 70 | 67 | 70 | 67 | 70 | 67 | 69 |
|  | Wet grip performance |  | 100 | 99 | 98 | 99 | 98 | 102 | 99 | 99 | 98 | 101 | 97 |
|  | Dry grip performance |  | 103 | 99 | 99 | 101 | 100 | 103 | 103 | 101 | 100 | 101 | 99 |
|  | Handling performance (Handling stability) |  | 110 | 120 | 105 | 120 | 140 | 120 | 140 | 120 | 140 | 120 | 110 |
|  | Rolling resistance |  | 100 | 96 | 65 | 98 | 94 | 93 | 90 | 92 | 90 | 90 | 85 |
|  | Abrasion resistance |  | 110 | 115 | 105 | 105 | 113 | 111 | 137 | 118 | 117 | 135 | 153 |

|  |  |  | Examples | | Comparative Examples | | | | | | | |
|---|---|---|---|---|---|---|---|---|---|---|---|---|
|  |  |  | 12 | 13 | 1 | 2 | 3 | 4 | 5 | 6 | 7 | 8 |
| Formulation (part(s) by mass) | Process 1 | ENR (1) | — | 100 | 100 | 100 | 100 | 100 | 70 | 70 | 20 | — |
|  |  | ENR (2) | 70 | — | — | — | — | — | — | — | — | 70 |
|  |  | BR (1) | — | — | — | — | — | — | 30 | 30 | 80 | — |
|  |  | BR (2) | 30 | — | — | — | — | — | — | — | — | 30 |
|  |  | Silica | 75 | 75 | 75 | 75 | 52 | 75 | 75 | 75 | 75 | 75 |
|  |  | Silane coupling agent | 6.0 | 6.0 | 6.0 | 6.0 | 4.2 | 6.0 | 6.0 | 6.0 | 6.0 | 6.0 |
|  |  | Vegetable oil | 10 | 10 | 10 | 10 | 10 | 10 | 10 | 10 | 10 | 10 |
|  |  | Alkaline fatty acid metal salt | 4 | 5 | 5 | 5 | 5 | 5 | 4 | 4 | 4 | — |
|  |  | Stearic acid | 2 | 2 | 2 | 2 | 2 | 2 | 2 | 2 | 2 | 2 |
|  |  | Anti-reversion agent (1) | 3 | 3 | — | — | — | — | — | — | — | — |
|  |  | Anti-reversion agent (2) | — | — | — | — | — | 1 | — | 1 | 1 | — |
|  |  | Zinc oxide | 3 | 5 | 3 | 3 | 3 | 3 | 3 | 3 | 3 | 3 |
|  |  | Age resistor | 1.5 | 1.5 | 1.5 | 1.5 | 1.5 | 1.5 | 1.5 | 1.5 | 1.5 | 1.5 |
|  |  | Wax | 1.5 | 1.5 | 1.5 | 1.5 | 1.5 | 1.5 | 1.5 | 1.5 | 1.5 | 1.5 |
|  | Process 2 | Sulfur | 2.0 | 1.05 | 2.1 | 2.8 | 2.8 | 2.1 | 2.1 | 2.1 | 2.0 | 2.0 |
|  |  | Vulcanization accelerator | 2.0 | 2.0 | 2.0 | 2.0 | 2.0 | 2.0 | 2.0 | 2.0 | 2.0 | 2.0 |
| Vulcanization condition |  |  | High TEMP | High TEMP | High TEMP | High TEMP | High TEMP | High TEMP | High TEMP | High TEMP | High TEMP | High TEMP |
| Total sulfur content (% by mass) |  |  | 1.69 | 1.22 | 1.75 | 2.08 | 2.11 | 1.75 | 1.76 | 1.75 | 1.71 | 1.74 |
| Total crosslink density ($10^{-5}$ mol/cm$^3$) |  |  | 9.0 | 8.0 | 6.0 | 7.1 | 7.3 | 9.0 | 5.9 | 8.0 | 8.5 | 5.4 |
| Evaluation | Reversion ratio (%) |  | 2 | 0.2 | 17 | 24 | 25 | 9 | 16 | 10 | 1.3 | 19 |
|  | Hardness |  | 69 | 66 | 63 | 66 | 61 | 65 | 63 | 64 | 70 | 68 |
|  | Wet grip performance |  | 115 | 100 | 100 | 99 | 96 | 95 | 97 | 95 | 62 | 115 |
|  | Dry grip performance |  | 105 | 100 | 100 | 98 | 97 | 97 | 100 | 100 | 84 | 102 |
|  | Handling performance (Handling stability) |  | 140 | 115 | 100 | 115 | 90 | 110 | 100 | 105 | 95 | 110 |
|  | Rolling resistance |  | 102 | 98 | 100 | 107 | 95 | 110 | 97 | 99 | 77 | 108 |
|  | Abrasion resistance |  | 118 | 110 | 100 | 95 | 90 | 95 | 108 | 97 | 146 | 93 |

Table 1 shows that reversion ratio was high in Comparative Examples 1 to 3 and Comparative Examples 5 and 8. On the other hand, the reversion ratio was improved in every Example in which the rubber composition contained a white filler and a rubber component including the specific amount or more of an epoxidized natural rubber, had a total sulfur content of less than the specific value, and had the predetermined value or more of the crosslink density. Especially by allowing the rubber composition to contain a larger amount of a mixture of a zinc salt of an aliphatic carboxylic acid and a zinc salt of an aromatic carboxylic acid, by performing vulcanization at a lower temperature, and/or by increasing the amount of zinc oxide, the reversion ratio was more reduced, and a higher crosslink density was obtained with a lower total sulfur content. Therefore, in all Examples, the handling stability was good and the rolling resistance was equal to or better than in Comparative Examples. Particularly in Example 3 in which the amount of silica was largely reduced, the rolling resistance was significantly reduced while maintaining the handling stability at a practically acceptable level. Moreover, the abrasion resistance in Example 3 was at a practically acceptable level as well. In other Examples, the abrasion resistance was good, and the abrasion resistance was especially good in Examples 7 to 12 in which BR was blended. Furthermore, in Examples, the wet grip performance and the dry grip performance were good or equal to those in Comparative Example 1. In Example 12 in which ENR (2) (epoxidation degree: 37.5 mol %) was blended, the wet grip performance was particularly good.

The rubber composition obtained in Comparative Example 1 showed a high reversion ratio because it had the specific value or more of the total sulfur content, and was vulcanized at a high temperature without effective measurement for inhibiting reversion. Therefore, a sufficient crosslink density was not achieved and further, a good balance of excellent rolling resistance, wet grip performance, dry grip performance, handling stability, and durability (abrasion resistance, crack resistance) was not achieved in Comparative Example 1.

In Comparative Example 2, the necessary total crosslink density was achieved by increasing the amount of sulfur; however, the rolling resistance property and the abrasion resistance were inferior to those in Examples due to the high reversion ratio and a large amount of sulfur crosslinking in an unfavorable form. In Comparative Example 3, partially due to the low blending amount of silica, the hardness was low and good handling stability was not achieved. Moreover, the wet grip performance, dry grip performance and abrasion resistance in Comparative Example 3 were inferior to those in Examples. In Comparative Example 4, although the anti-reversion agent (2) was blended, the performance for preventing reversion was not sufficient compared with the case where the anti-reversion agent (1) (mixture of a zinc salt of an aliphatic carboxylic acid and a zinc salt of an aromatic carboxylic acid) was used, and also the wet grip performance, dry grip performance, rolling resistance property and abrasion resistance were inferior to those in Examples. In Comparative Examples 5, although BR was blended, since vulcanization was performed at a high temperature and the anti-reversion agent (1) was not blended, the reversion ratio was high and the hardness was low. As a result, the rolling resistance property, handling stability and wet grip performance were inferior to those in the corresponding Examples. In Comparative Example 6, although BR was blended, since the anti-reversion agent (2) was used, the reversion ratio was slightly high. Also, the abrasion resistance, wet grip performance, and rolling resistance property in Comparative Example 6 were inferior to those in the corresponding Examples. In Comparative Example 7 in which BR was blended, since the amount of ENR did not reach the specific amount, and the anti-reversion agent (2) was used, the wet grip performance, dry grip performance, and handling stability were inferior to those in Examples. In Comparative Example 8 in which BR was blended, since no anti-reversion agent was blended, the reversion ratio was high, and the rolling resistance property and abrasion resistance were inferior to those in Examples.

The invention claimed is:

1. A rubber composition for a tread comprising:
   a rubber component containing 5-60% by mass of polybutadiene rubber and 35% by mass or more of an epoxidized natural rubber, wherein said epoxidized natural rubber has an epoxidation degree of 5 mol% to 60 mole%;
   an alkaline fatty acid metal salt; and
   a white filler,
   wherein a total sulfur content is less than 1.75% by mass, and a crosslink density is $7.0 \times 10^{-5}$ mol/cm$^3$ or more.

2. The rubber composition for a tread according to claim 1, wherein the white filler is silica.

3. The rubber composition for a tread according to claim 1, further comprising a mixture of a zinc salt of an aliphatic carboxylic acid and a zinc salt of an aromatic carboxylic acid.

4. The rubber composition for a tread according to claim 3, wherein the amount of the mixture per 100 parts by mass of the rubber component is 0.2-10 parts by mass.

5. The rubber composition for a tread according to claim 3, further comprising a fatty acid,
   wherein the total amount of the alkaline fatty acid metal salt, the mixture of a zinc salt of an aliphatic carboxylic acid and a zinc salt of an aromatic carboxylic acid, and the fatty acid per 100 parts by mass of the rubber component is 2.5-20 parts by mass.

6. The rubber composition for a tread according to claim 1, wherein the vulcanization temperature is 120° C. to 165° C.

7. The rubber composition for a tread according to claim 1, wherein the amount of the alkaline fatty acid metal salt per 100 parts by mass of the ENR is 1.0-10 parts by mass.

8. A pneumatic tire having a tread manufactured by using the rubber composition according to claim 1.

9. A tire having a tread formed from the rubber composition of claim 1.

10. A tire having a tread formed from the rubber composition of claim 4.

11. A tire having a tread formed from the rubber composition of claim 7.

12. A tire having a tread formed from the rubber composition of claim 5.

* * * * *